United States Patent [19]

Yamamoto et al.

[11] Patent Number: 5,897,631
[45] Date of Patent: *Apr. 27, 1999

[54] RANDOMLY ACCESSIBLE RECORDING MEDIUM, AND APPARATUS AND METHOD FOR MANAGING DATA THEREON

[75] Inventors: Tsutomu Yamamoto; Hiroyuki Fujita, both of Kanagawa, Japan

[73] Assignee: Sony Corporation, Tokyo, Japan

[*] Notice: This patent is subject to a terminal disclaimer.

[21] Appl. No.: 08/976,983

[22] Filed: Nov. 24, 1997

Related U.S. Application Data

[63] Continuation of application No. 08/548,982, Oct. 27, 1995, Pat. No. 5,740,435.

[30] Foreign Application Priority Data

Oct. 31, 1994 [JP] Japan .................................. 6-266419
Oct. 31, 1994 [JP] Japan .................................. 6-266634
Oct. 31, 1994 [JP] Japan .................................. 6-267680

[51] Int. Cl.$^6$ .................................................. G06F 17/30
[52] U.S. Cl. .............................. 707/1; 707/100; 707/101; 707/104; 707/205
[58] Field of Search .............................. 707/1, 205, 100, 707/101, 104

[56] References Cited

U.S. PATENT DOCUMENTS

| | | | |
|---|---|---|---|
| 5,107,481 | 4/1992 | Miki et al. | 369/59 |
| 5,150,473 | 9/1992 | Zulch | 395/425 |
| 5,285,327 | 2/1994 | Hetzler | 360/48 |
| 5,479,656 | 12/1995 | Rawlings, III | 395/497.02 |
| 5,551,020 | 8/1996 | Flax et al. | 707/101 |
| 5,740,435 | 4/1998 | Yamamoto et al. | 707/205 |

*Primary Examiner*—Thomas G. Black
*Assistant Examiner*—Donald Min
*Attorney, Agent, or Firm*—Frommer Lawrence & Haug, LLP.; William S. Frommer

[57] ABSTRACT

A system for managing data including at least a randomly accessible recording medium, comprised of a data area in which recordal data is recorded in one or more variable length recording blocks by file and a management data area in which file entries and recording entries for each recording block of the files are recorded, the file entries including name data showing the names of the recordal data recorded in the files and identification data showing the record entries of the first recording blocks in which the recordal data are recorded, the record entries including head position data showing the heads of the recording blocks, link data showing the recording blocks in which continuations of the recordal data are recorded, and recording length data showing the recording lengths of the recording blocks.

6 Claims, 16 Drawing Sheets

| SYSTEM AREA (SA) | MEDIUM IDENTIFIER<br>USER INFORMATION<br>FILE SYSTEM PARAMETERS |
|---|---|
| FILE ENTRIES (FE) | FILE ENTRIES |
| CONTINUOUS AREA (CA) | CA SUPERBLOCK<br>RECORD ENTRIES<br>EMPTY AREA INFORMATION<br>CONTINUOUS DATA |
| RANDOM AREA (RA) | RA SUPERBLOCK<br>I-NODE BIT MAP<br>BLOCK BIT MAP<br>I-NODE<br>RANDOM DATA |

FIG. 1A
RELATED ART
FILE ENTRY | FILE NAME : "file 1"
HEAD FAT No : 3
FIG. 1B
RELATED ART
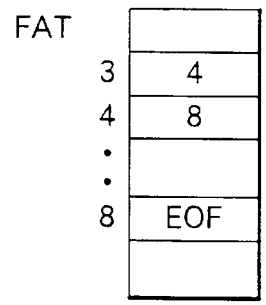
FIG. 1C
RELATED ART
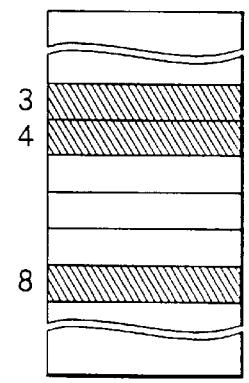

FILE ENTRY | FILE NAME : "file 2"
i-node No : 20 i-node 20 | FILE SIZE : 3000

BLOCK POINTER 1 : 3
BLOCK POINTER 2 : 4
BLOCK POINTER 3 : 8

| FIL

FIG. 5

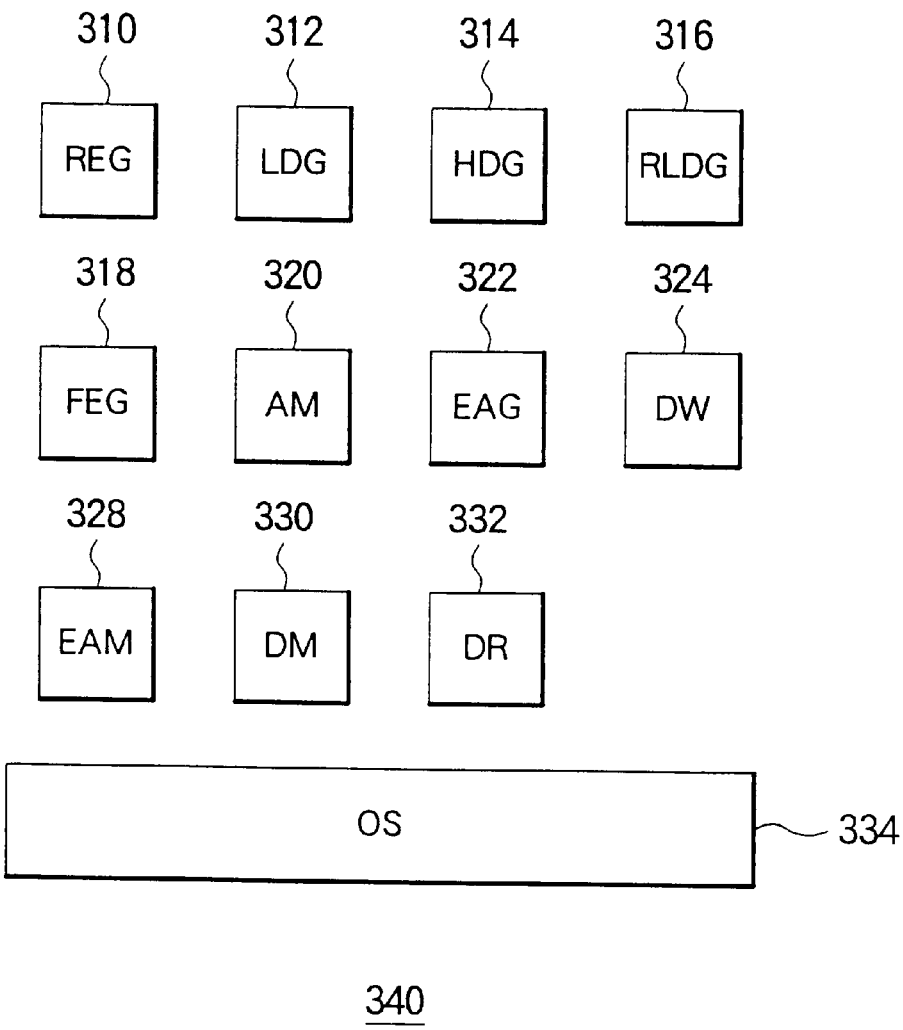

REG : RECORD ENTRY GENERATING PROGRAM
LDG : LINK DATA GENERATING PROGRAM
HDG : HEAD POSITION DATA GENERATING PROGRAM
FEG : FILE ENTRY GENERATING PROGRAM
RLDG : RECORDING LENGTH DATA GENERATING PROGRAM
AM : ACCESS MANAGEMENT PROGRAM
EAG : EMPTY AREA GUARANTEEING PROGRAM
DW : RECORDAL DATA WRITING PROGRAM
EAM : EMPTY RECORDING AREA MANAGEMENT PROGRAM
DM : DATA MANAGEMENT PROGRAM
DR : RECORDAL DATA READING PROGRAM
OS : OPERATING SYSTEM

FILE ENTRY | FILE NAME : "file A"
HEAD RECORD ENTRY No : 3

RECORD ENTRY No.3 | LINK:<EOF> BID : 200 RSIZE : 1000

FILE ENTRY  
FILE NAME : "file A"  
HEAD RECORD ENTRY No. : 1

RECORD ENTRY 1 | LINK : 2  BID : 1200  RSIZE : 100  
RECORD ENTRY 2 | LINK : 4  BID : 1400  RSIZE : 600  
RECORD ENTRY 4 | LINK : <EOF>  BID : 2200  RSIZE : 300

FIG. 10A

| SYSTEM AREA (SA) | MEDIUM IDENTIFIER<br>USER INFORMATION<br>FILE SYSTEM PARAMETERS |
|---|---|
| FILE ENTRIES (FE) | FILE ENTRIES |
| CONTINUOUS AREA (CA) | CA SUPERBLOCK<br>RECORD ENTRIES<br>EMPTY AREA INFORMATION<br>CONTINUOUS DATA |
| RANDOM AREA (RA) | RA SUPERBLOCK<br>I-NODE BIT MAP<br>BLOCK BIT MAP<br>I-NODE<br>RANDOM DATA |

FIG. 10B

| ITEM | SIZE |
|---|---|
| MEDIUM IDENTIFIER | 4 |
| USER INFORMATION | 32 |
| FE START BLOCK | 4 |
| CA START BLOCK | 4 |
| RA START BLOCK | 4 |
| NO. OF FILE ENTRIES | 2 |
| NO. OF RECORD ENTRIES | 2 |
| NO. OF I-NODES | 2 |

FIG. 11

| ITEM | SIZE |
|---|---|
| FILE NAME | 32 |
| FILE IDENTIFIER | 2 |
| RECORD ENTRY NO. OR I-NODE NO. | 4 |
| FILE SIZE | 4 |
| DATA OF CREATION | 4 |
| TIME OF CREATION | 4 |

FIG. 13

| ITEM | SIZE |
|---|---|
| FILE NAME | 32 |
| RECORD ENTRY NO. | 4 |
| I-NODE NO. | 4 |
| CONTINUOUS DATA SIZE | 4 |
| RANDOM DATA SIZE | 4 |
| CONTINUOUS DATA CREATION DATE | 4 |
| CONTINUOUS DATA CREATION TIME | 4 |
| RANDOM DATA CREATION DATE | 4 |
| RANDOM DATA CREATION TIME | 4 |

FIG. 14

| ITEM | CONTENT | SIZE (BYTE) |
|---|---|---|
| POINTER 0 | POINTER 0 TO DATA BLOCK | 4 |
| POINTER 1 | POINTER 1 TO DATA BLOCK | 4 |
| POINTER 2 | POINTER 2 TO DATA BLOCK | 4 |
| POINTER 3 | POINTER 3 TO DATA BLOCK | 4 |
| POINTER 4 | POINTER 4 TO DATA BLOCK | 4 |
| POINTER 5 | POINTER 5 TO DATA BLOCK | 4 |
| INDEX | POINTER TO INDIRECT ASSIGNMENT BLOCK | 4 |
| TOTAL | | 28 |

RANDOMLY ACCESSIBLE RECORDING MEDIUM, AND APPARATUS AND METHOD FOR MANAGING DATA THEREON

This application is a continuation of application Ser. No. 08/548,982, filed Oct. 27, 1995 now U.S. Pat. No. 5,740,435.

BACKGROUND OF THE INVENTION

1. Field of the Invention

The present invention relates to a system for data management managing data of a relatively long length such as video data and audio data recorded on variable length recording areas of a randomly accessible recording medium such as a magnetooptic (MO) disc or hard disc (HD), more particularly relates to randomly accessible recording media, a method of data management, a method of generating and recording management data, and data management apparatuses used in such a system.

2. Description of the Related Art

When recording or reproducing data to or from a randomly accessible recording medium such as a magnetooptic disc or hard disc, it becomes necessary to manage data managing what data are recorded at what recording areas of the recording medium.

In the management of data in MS-DOS (trademark of Microsoft Corporation), the operating system of personal computers, as shown in FIG. 1A to FIG. 1C, use is made of the FAT system using a table called a "file allocation table" (FAT). In the management of data in the operating system of general purpose computers known as UNIX (trademark of ATT), as shown in FIG. 2A to FIG. 2C, use is made of the i-node system using a table called an "i-node".

FIG. 1A shows the content of a file entry, FIG. 1B shows the content of the FAT, and FIG. 1C shows the recording areas on a recording medium.

In MS-DOS, recording areas (file data areas) are allocated in units of clusters on the recording medium for each of the files containing data to be managed (recordal data). A file entry is prepared for each file as shown in FIG. 1A, and a column of the FAT (FAT entry) shown in FIG. 1B is prepared for each cluster.

As shown in FIG. 1A, a file entry has recorded in it the data showing the name of the file (file name) stored in the corresponding clusters and the no. of the cluster at which the head portion of the file is recorded (head FAT no.)

As shown in FIG. 1B, each FAT entry has recorded in it data showing the state of use of the cluster, that is, the state of non-use, two types of states of use, and a defective state. Among the two types of states of use, when the cluster is in use and a continuation of the recordal data is recorded in another cluster, data showing the next cluster no. is recorded, while when the cluster is in use and there is no continuation of the recordal data recorded in another cluster, an "end-of-file" (EOF) showing that the cluster is the last cluster is recorded.

Accordingly, in the clusters of the recording medium, as shown by the hatching in FIG. 1C, when the file "file 1" ("file 1" being a file name) is recorded at the clusters 3, 4, and 8, "file 1" is recorded as the data showing the file name of the file entry and "3" is recorded as the head FAT no.

Further, the FAT entry (FAT3) corresponding to the cluster 3 has recorded in it the no. "4" of the next cluster on which a continuation of the recordal data is recorded so as to show that a continuation of the recordal data is recorded at another cluster. Similarly, the FAT4 has the next cluster no. "8" recorded in it. The FAT8 has recorded in it the "end-of-file" (EOF) for showing that the cluster is in use, but that no continuation of the recordal data is recorded at another cluster.

MS-DOS, when for example reading a file "file 1", first runs a search referring to the data showing the file names of the file entries so as to find the file entry corresponding to the file "file 1". Next, it refers to the head FAT no. of the file entry it found and then refers to the FAT 4 from the content of the FAT3. Finally, it recognizes the "end-of-file" of the FAT8 from the content of the FAT4 and stops referring to the FAT entries. In this way, MS-DOS successively traces back from the FAT entry shown by the head FAT no. to the FAT entry in which the "end-of-file" is recorded to thereby be able to read from the recording medium the file "file 1" recorded at the clusters 3, 4, and 8.

FIGS. 2A to 2C are views illustrating the management of data by the i-node system, wherein FIG. 2A shows the content of a file entry, FIG. 2B shows the content of an i-node, and FIG. 2C shows recording areas on a recording medium.

In the i-node system, a file entry shown in FIG. 2A corresponding to each file and an i-node shown in FIG. 2B are prepared.

In the i-node system, a file entry has recorded in it data showing the file name and an i-node no. showing the i-node of that file. An i-node has recorded in it the file size showing the length of data of the file and block pointers (direct assignment pointers) directly showing for example 1,024 byte unit recording areas (blocks) at which the file is recorded. Note that the i-node sometimes has recorded data showing attributes of the file. Further, it sometimes has recorded an indirect assignment pointer showing a block in which is recorded a plurality of direct assignment pointers instead of the direct assignment pointers.

For example, as shown in FIGS. 2B and 2C, when the content of the i-node is that the file "file 2" has data of a length of 3000 bytes and is recorded at blocks 3, 4, and 8, UNIX refers to the i-node and can recognize that the data of the file "file 2" is recorded at all of the blocks 3 and 4 and at the portion of the block 8 from the head to the 952nd byte.

The above-explained file entry and FAT or i-node are all recorded at predetermined areas on the recording medium.

If data is managed by the above-explained FAT system and i-node system, one FAT entry or one direct pointer of the i-node becomes necessary for each unit of the recording area (the above-mentioned cluster or block). Therefore, when managing data for a file containing recordal data of extremely long individual lengths such as audio data or video data, there is the problem that the recording areas for recording the FATs or i-nodes in the recording medium become extremely large.

This problem will be explained in more detail using as an example the case of a length of data of a cluster or block of 1 kbyte and a length of data of the recordal data of 100 Mbytes.

When managing data of a file containing such recordal data by the FAT system, the number of FAT entries required becomes 100,000. Therefore, to identify each of the 100,000 FAT entries, 4 bytes of data become necessary. Therefore, it is learned that 400 kbytes of memory are necessary for storing the FAT entries.

When managing data of a file containing such recordal data by the i-node system, the number of direct assignment pointers necessary becomes 100,000. Therefore, to identify each of the 100,000 direct assignment pointers, 4 bytes of data become necessary to show a single FAT entry. Therefore, it is learned that 400 kbytes of memory are necessary for recording all of the direct pointers in the same way as the FAT system.

In the FAT system or i-node system, to reduce the number of the FAT entries or the number of the i-node direct pointers, it may be considered to increase the length of the data of the cluster or the block for example. However, in these systems, the data of the files is managed in units of clusters or blocks, so when the length of the recordal data is not a whole multiple of the length of data of the clusters or the blocks, there is the problem of a large amount of waste occurring in the cluster or block recording the file which contains the final portion of the recordal data.

SUMMARY OF THE INVENTION

The present invention was made in consideration of the above problems in the prior art and has as its object to provide a method of data management and apparatus for the same enabling data to be managed using a table of a much shorter length of data compared with the FAT system and i-node system for a file containing data of an extremely long length, for example, audio data and video data.

Further, the present invention has as its object the provision of a method of data management and an apparatus for the same enabling a reduction of the recording area which the table for data management occupies in the recording medium and enables effective utilization of the recording medium.

Further, the present invention has as its object the provision of a method of data management and an apparatus for the same enabling a reduction of the wasted recording area caused on a recording medium regardless of if the data of the table used for the data management is short in length.

According to a first aspect of the present invention, there is provided a randomly accessible recording medium, including a data area in which recordal data is recorded in one or more variable length recording blocks by file and a management data area in which file entries and recording entries for each recording block of the files are recorded, the file entries including name data showing the names of the recordal data recorded in the files and identification data showing the record entries of the first recording blocks in which the recordal data are recorded, the record entries including head position data showing the heads of the recording blocks, link data showing the recording blocks in which continuations of the recordal data are recorded, and recording length data showing the recording lengths of the recording blocks.

According to a second aspect of the invention, there is provided a method of data management for managing data on a randomly accessible recording medium, comprised of a data area in which recordal data is recorded in one or more variable length recording blocks by file and a management data area in which file entries and recording entries for each recording block of the files are recorded, the file entries including name data showing the names of the recordal data recorded in the files and identification data showing the record entries of the first recording blocks in which the recordal data are recorded, the record entries including head position data showing the heads of the recording blocks, link data showing the recording blocks in which continuations of the recordal data are recorded, and recording length data showing the recording lengths of the recording blocks.

Wherein use is made of the name data showing the name of the recordal data to be accessed to find the file entry and use is made of the head position data and the recording length data of the record entry shown by the identification data of the file entry of the recordal data to be accessed and the record entry shown by the link data of that record entry to access the recordal data.

According to a third aspect of the present invention, there is provided a method of generating and recording recordal data on a randomly accessible recording medium and management data for managing that recordal data, comprised of the steps of:

a) generating a file entry including name data showing the name of the recordal data, b) acquiring record entry nos., c) writing the first record entry no. in the file entry as the head record entry no., d) securing an empty recording area in the data recording area on the recording medium, e) writing the head position of the empty recording area in the record entry as head position data, f) recording the recordal data in the empty recording area, g) writing the size of the recorded recordal data in the record entry as the recording length data when the empty recording area becomes full and there is still recordal data remaining, h) acquiring the next record entry no. and writing the next record entry no. in the previous record entry as link data when there is still recordal data remaining, i) repeating steps d) to h) until there is no longer any recordal data to be recorded, and j) writing the size of the recordal data recorded in the recording area in the recording entry as the recording length data and writing link down showing that it is the end in the final record entry when there is no longer any recordal data to be recorded.

According to a fourth aspect of the invention, there is provided a data management apparatus for managing recordal data recorded at recording areas of variable length on a randomly accessible recording medium, the data management apparatus provided with a record entry generating means for generating a record entry establishing correspondence among link data, head position data, and recording length data for each the recording area, a link data generating means for generating link data showing the record entry of the recording area on which a continuation of the recordal data recorded at the recording area is recorded, a head position data generating means for generating head position data showing the head position of the recording area, a recording length data generating means for generating recording length data showing the length of the recordal data recorded at the recording area, a file entry generating means for generating a file entry establishing correspondence between name data showing the name of the recordal data and identification data showing the record entry of the recording area on which the head portion of the recordal data is recorded, and an access management means for managing access to the recordal data using the name data showing the name of the recordal data to be accessed to search through the file entries and using the head position data and recording length data of the record entry shown by the identification data of the file entry of the recordal data to be accessed and the record entry shown by the link data of the record entry.

BRIEF DESCRIPTION OF THE DRAWINGS

These and other objects and features of the present invention will become clearer from the following description of the preferred embodiments made with reference to the attached drawings, wherein:

FIGS. 1A to 1C are view illustrating data management by the FAT system, wherein FIG. 1A shows the content of a file entry, FIG. 1B shows the content of an FAT, and FIG. 1C shows recording areas on a recording medium;

FIGS. 2A to 2C are views illustrating data management by the i-node system, wherein FIG. 2A shows the content of a file entry, FIG. 2B shows the content of an i-node, and FIG. 2C shows recording areas on a recording medium;

FIG. 5 is view of the configuration of a data management apparatus realized by a software format on a memory circuit (MEM) of the data storage apparatus shown in FIG. 2;

FIGS. 6A to 6C are views illustrating a table used for managing recordal data recorded by a data management apparatus according to the present invention on a single recording area, wherein FIG. 6A shows a file entry, FIG. 6B shows a record entry, and FIG. 6C shows a recording area on an MO disc;

FIGS. 7A to 7C are views illustrating a table used for managing recordal data recorded by a data management apparatus according to the present invention on a plurality of recording areas, wherein FIG. 7A shows a file entry, FIG. 7B shows a record entry, and FIG. 7C shows a recording area on an MO disc;

FIGS. 10A and 10B are views of the configuration of an MO disk used in a data storage apparatus of an AV server apparatus shown in FIG. 3, wherein FIG. 10A is a view of the overall configuration of an MO disk and FIG. 10B is a view of the configuration in a system area SA;

FIG. 11 is view of the configuration of a file entry FE of an MO disk;

FIG. 13 is a view of the configuration of a file entry FE of an MO disk;

FIG. 14 is a view of the configuration of the i-node in the random area RA;

DESCRIPTION OF THE PREFERRED EMBODIMENTS

The embodiments of the present invention will be explained below.

First, referring to FIG. 3 to FIG. 5, an explanation will be made of the configuration of the video signal server system to which the data management apparatus 340 according to the present invention shown in FIG. 5 is applied and the data storage apparatus $30_i$ and the configuration of the data management apparatus 340.

Figure 3:
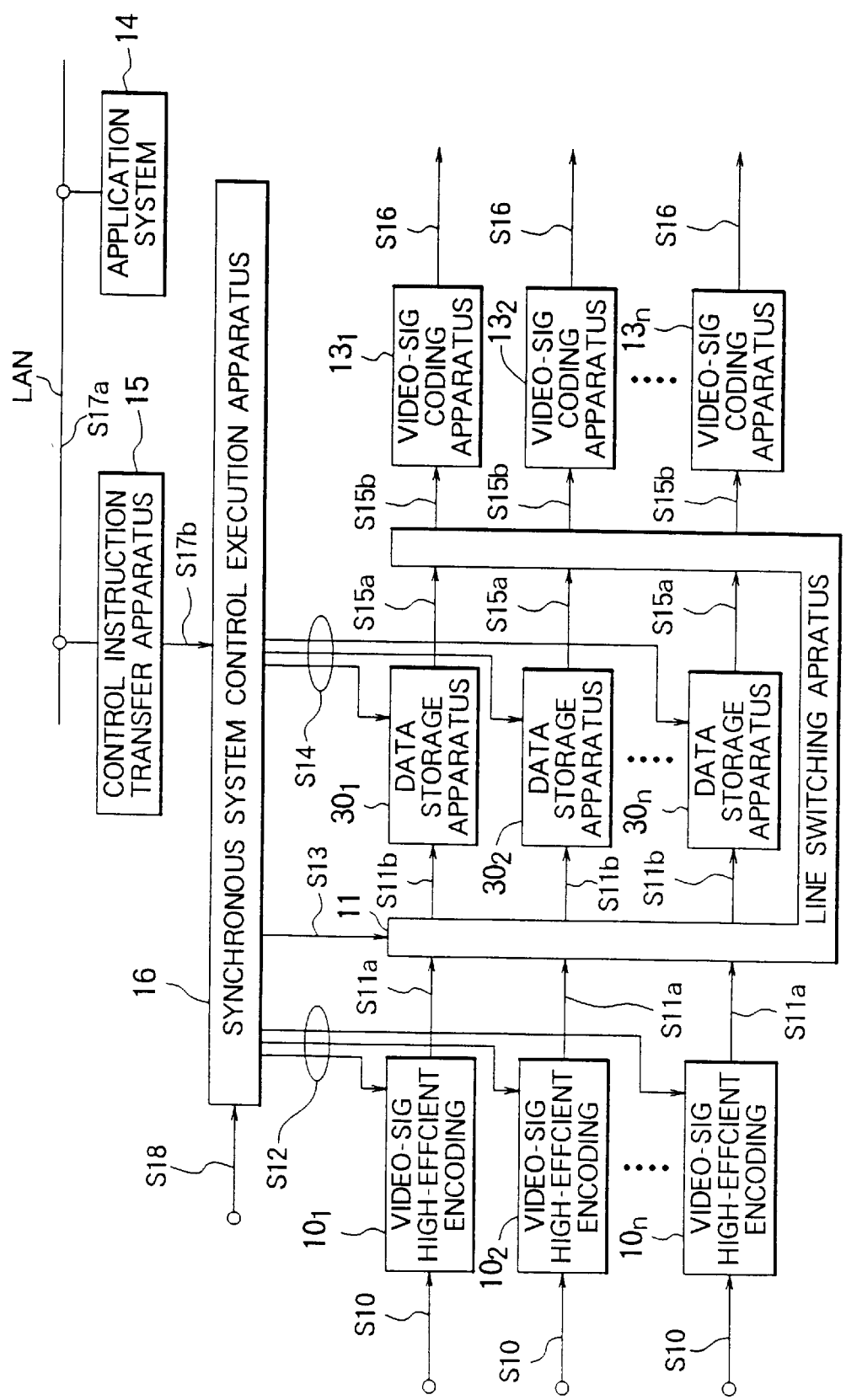
FIG. 3 is a block diagram of a video signal server system to which the data management apparatus according to the present invention is applied.

FIG. 3 is a block diagram of a video signal server system to which the data management apparatus 340 according to the present invention is applied.

In FIG. 3, digitalized input video signals S10 are input to the variable encoding rate video signal high-efficient encoding apparatuses $10_1$ to $10_n$ where they are encoded at a high efficiency and become the high-efficient encoded video data S11a.

The encoding rates of the video signal high-efficient encoding apparatuses $10_1$ to $10_n$ are set in advance by the control signals S12 from the synchronous system control execution apparatus 16.

If the high-efficient encoding apparatuses $10_1$ to $10_n$ extract the clocks and frame timing from the input video signals S10 and use them internally, then it would become possible to input the video signals in synchronization with the video signal synchronization signal.

The high-efficient encoded video data S11a are input to a line switching apparatus 11 such as a routing switcher for a broadcasting station. In the line switching apparatus 11, the destination of the line switching operation is set by a control signal S13 from the synchronous system control execution apparatus 16. Accordingly, the high-efficient encoded video data S11a input to the line switching apparatus 11 are conveyed to the data storage apparatuses $30_1$ to $30_n$ connected by the set route as input high-efficient encoded video data S11b.

The high-efficient encoded video data S11b are recorded in the independently controlled data storage apparatuses $30_1$ to $30_n$ by a control signal S14 from the synchronous system control execution apparatus 16.

The data storage apparatuses $30_i$ (i=1 to n) follow the control of the synchronous system control execution apparatus 16 through the control signal S14 and use the data management apparatus 340 to record the input high-efficient encoded video data S11b input from the video signal high-efficient encoding apparatuses $10_1$ to $10_n$ through the line switching apparatus 11, and manage the recorded input high-efficient encoded video signal data S11b or reproduce the input high-efficient encoded video data S11b designated by an editor etc. operating a host user system 14 and output it as the reproduced high-efficient encoded video data S15a to the line switching apparatus 11. Note that the configurations of the data storage apparatuses $30_i$ and the data management apparatus 340 will be explained later with reference to FIG. 4 and FIG. 5.

The reproduced high-efficient_encoded video data S15a is input to the line switching apparatus 11 in the same way as at the time of recording. In the line switching apparatus 11, the destination of the line switching operation is set by a control signal S13 from the synchronous system control execution apparatus 16. Accordingly, the high-efficient encoded video data S15a input to the line switching apparatus 11 is conveyed to the predetermined video signal decoding apparatuses $13_1$ to $13_n$ connected by the set route as the high-efficient encoded video data S15b.

The high-efficient encoded video data S15b are decoded in the video signal decoding apparatuses $13_1$ to $13_n$ into the decoded video signals S16 which are then output outside of the system, for example, to an editing apparatus.

In the example of FIG. 3, no control signal was input to the video signal decoding apparatuses 13, but this was because this type of decoding apparatus is configured to automatically track changes in the encoding rate.

Further, in the control system of this system, first, a plurality of independent control instructions S17a issued from a host user system 14 comprised of one or more computers are successively transferred through a LAN to a control instruction transfer apparatus 15 usually comprised of a single computer in the form based on the general purpose protocol.

The control instruction transfer apparatus 15 transfers to the synchronous system control execution apparatus 16 the control instructions S17b obtained by protocol conversion for enabling communication with the synchronous system control execution apparatus 16.

Figure 4:
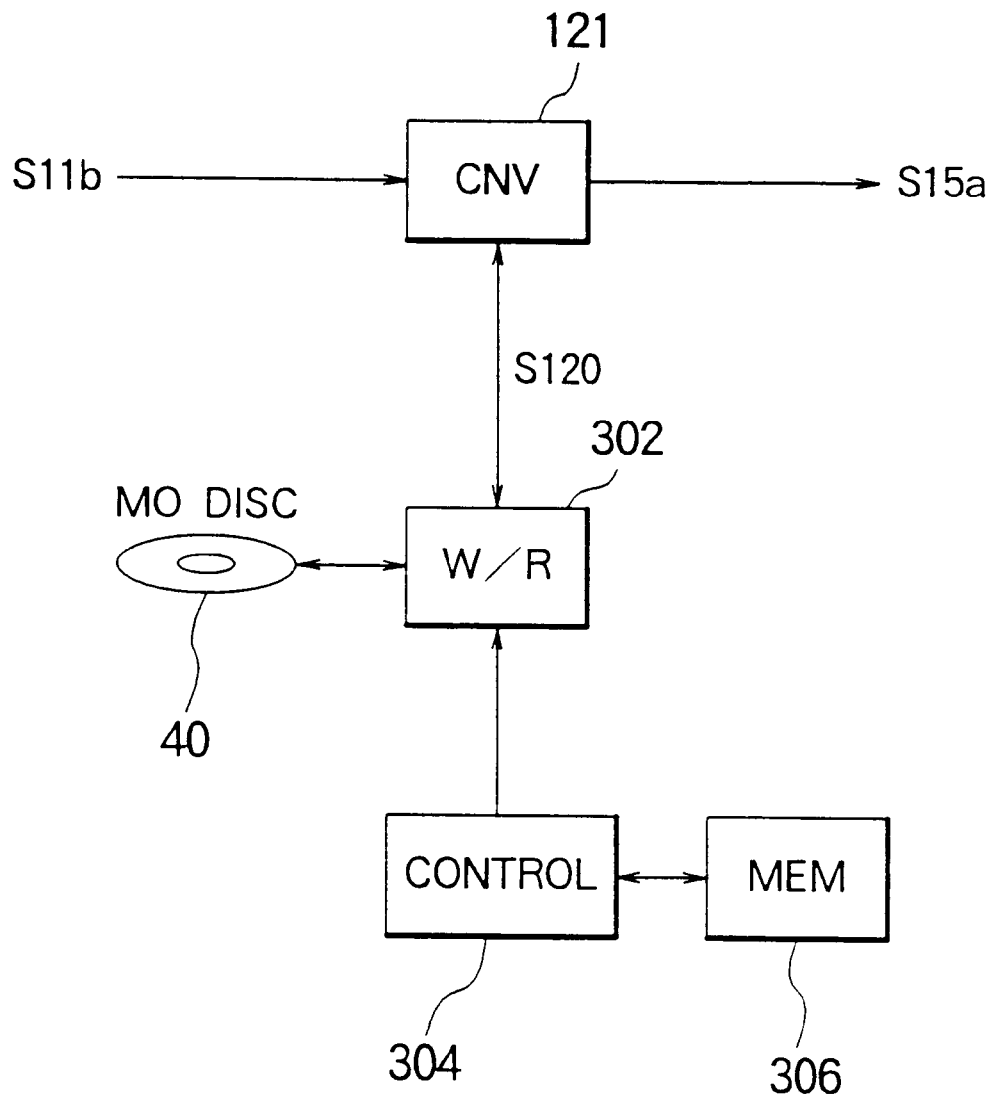
FIG. 4 is view of the configuration of the data storage apparatus shown in FIG. 3.

FIG. 4 is a view of the configuration of a data storage apparatus $30_i$ shown in FIG. 3, while FIG. 5 is a view of the configuration of a data management apparatus 340 realized by a software format on a memory circuit (MEM) 306 of the data storage apparatus $30_i$ shown in FIG. 4.

As shown in FIG. 4, the data storage apparatus $30_i$ is comprised of a control format conversion apparatus (CNV) 121 and a disc apparatus 32. The disc apparatus 32 is comprised of a writing/reading circuit (W/R apparatus) 302, a control circuit 304, and a memory circuit 306.

The high-efficient encoded video data S11b transferred by a data transmission medium able to transfer a baseband digital video signal is input to the data and control format conversion apparatus 121 where it is converted to a format able to be input to the disc apparatus 32.

On the other hand, the data reproduced from the disc apparatus 32 is input to the data and control format conversion apparatus 121 where it is converted to the same data format as at the time of recording and becomes the reproduced high-efficient encoded video data S15a which is transmitted by a data transmission medium able to transmit a baseband digital video signal.

The data and control format conversion apparatus 121 converts the control format to a format able to control the disc apparatus 32 in accordance with a control signal S14 from the synchronous system control execution apparatus 16.

The W/R apparatus 302 follows the control of the control circuit 304, causes the MO disc 40 to turn, and writes the recordal data from the control format conversion apparatus 121 on the MO disc 40 or reads the recordal data from the MO disc and outputs it to the W/R apparatus 302.

The control circuit 304 follows the control of the synchronous system control execution apparatus 16 through the control signal S14 and executes the programs of the data management apparatus 340 stored in the memory circuit 306 to control the W/R apparatus 302 and cause the recordal data to be recorded on or reproduced from the MO disc 40.

Note that the data storage apparatus $30_i$ writes and reads (accesses) recordal data to and from the MO disc 40 in block units. The length of data of each block is for example 1 kbyte.

By configuring the system in this way, the data and control format conversion apparatus 121 and the disc apparatus 32 can be connected through a general use connection line S120 carrying a mixture of ordinary data and control signals and recording and reproduction of encoded video data becomes possible using a disc apparatus.

Further, by configuring the system in this way, the data storage apparatus $30_i$ can be changed in the speed of recording and reproduction up to the extent of the maximum data transfer speed of the disc apparatus 32.

Further, as shown in FIG. 5, the data management apparatus 340 is realized in the form of software executed in the control circuit 304 on the memory circuit 306. It is comprised of a record entry generating program (REG) 310, a link data generating program (LDG) 312, a head position data generating program (HDG) 314, a recorded length data generating program (RLDG) 316, a file entry generating program (FEG) 318, an access management program (AM) 320, an empty area securing program (EAG) 322, a recordal data writing program (DW) 324, an empty recording area management program (EAM) 328, a data management program (DM) 330, a recordal data reading program (DR) 332, and an operating system (OS) 334 for controlling the execution of these programs.

Below, an explanation will be made, referring to FIGS. 6A to 6C and FIGS. 7A to 7C, of the content of a table used in the management of data by the data management apparatus 340 taking as an example the case of recording on an MO disc a file "file A" ("file A" being the file name) containing extremely long recordal data of a length of 1000 kbytes, such as audio data or video data (hereinafter referred to as "record entry system data management").

Figures 6A, 6B, 6C:
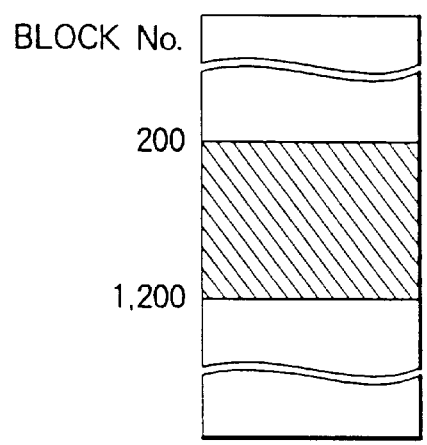
Figures 7A, 7B, 7C:
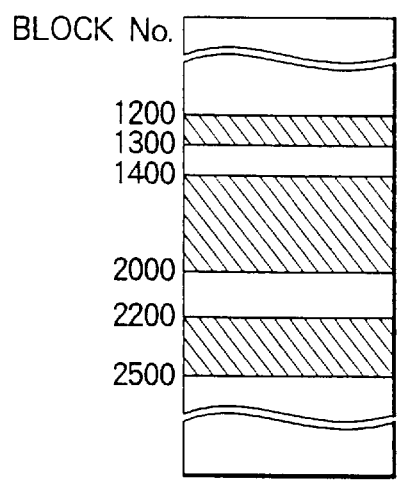

In the management of data by the data management apparatus 340, a file containing recordal data is, as shown in FIG. 6C and FIG. 7C, recorded as much as possible on one or more continuous recording areas on the MO disc 40. A file entry shown in FIG. 6A and FIG. 7A is generated for each file. A record entry shown in FIG. 6B and FIG. 7B is generated for each continuous recording area.

Note that each record entry is given a record entry no. Further, the file entries and record entries are recorded at a predetermined area of the MO disc 40.

A file entry contains the name data showing the file name of the corresponding file and head position data showing the record entry no. corresponding to the recording area where the head portion of the file "file A" is recorded. In the examples shown in FIGS. 6A to 6C and FIGS. 7A to 7C, the name data is the "file A" and the head position data is "3".

A record entry contains the link data (LINK) showing the record entry of the next recording area where a continuation of the file recorded in the corresponding recording area is recorded, head position data (BID) showing the head position on the MO disc 40 of the corresponding recording area, and the recording length data (RSIZE) showing the length of the data of the corresponding recording area.

Note that, as shown in FIG. 6C, when the file "file A" is recorded from block 200 to 1,200 on the MO disc 40, that is, in a single recording area, the content of the link data is "end-of-file" (EOF) showing that the recording area is the last recording area in which the file "file A" is recorded and the recording length data is "1,000".

Further, as shown in FIG. 7C, when the file "file A" is recorded divided among a number of recording areas, such as the blocks 1,200 to 1,300, the blocks 1,400 to 2,000, and the blocks 2,200 to 2,500, the link data of just the record entry corresponding to the recording area recording the last portion of the file "file A" becomes "end-of-file" (EOF). The link data of the record entries corresponding to the recording areas on which the other portions of the file "file A" are recorded become the nos. of the record entries corresponding to the next recording areas where the continuations of the file "file A" are recorded.

Accordingly, in the example shown in FIGS. 7A to 7C, the link data of the record entry of the record entry no. 1 (record entry 1) becomes "2", the link data of the record entry 2 becomes "4", the link data of the record entry 4 becomes "EOF", and the recording length data become "100", "600", and "300".

Below, an explanation will be made of the operation of a data storage apparatus $30_i$ based around the operation of the data management apparatus 340 referring to FIG. 8 and FIG. 9.

Figure 8:
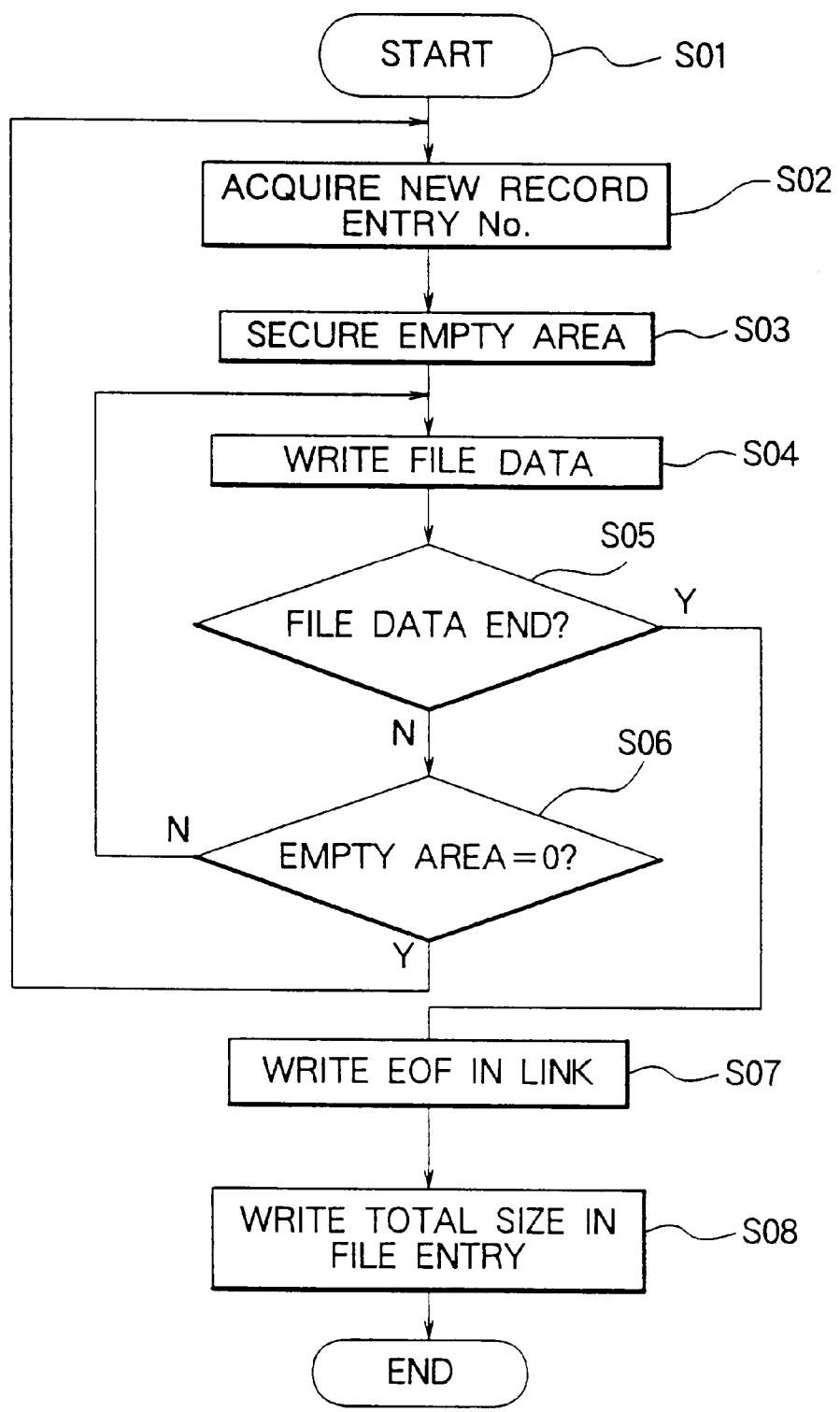
FIG. 8 is a flow chart of the processing of the data management apparatus according to the present invention in the case where the data storage apparatus shown in FIG. 3 writes recordal data on an MO disc.

When the data storage apparatus $30_i$ is writing a new file containing predetermined recordal data, for example, the file "file A" explained above in FIGS. 6A to 6C and FIGS. 7A to 7C, on the MO disc 40, the data management apparatus 340 performs the processing in accordance with the flow chart shown in FIG. 8. Note that as explained above, the programs in the following processing are executed by the control circuit 304. The execution is controlled by the OS 334 (FIG. 5). Further, for simplification of the explanation, irrelevant processing etc. will be omitted from the FIG. 8 and FIG. 9 and the following explanation.

As shown in FIG. 8, at step 01 (S01), when a control signal S14 to the effect of causing the control circuit 304 to write the file "file A" in the MO disc containing the identification data of the file "file A" is input from the synchronous system control execution apparatus 16 (FIG. 3) through the control format conversion apparatus 121 (FIG. 4), the access management program 320 activates the recordal data reading program 332 and the file entry generating program 318. The recordal data reading program 332 controls the W/R apparatus 302 to read the file out from the MO disc the file entries and record entries already stored in the MO disc 40 and store the same in the memory circuit 306. Further, the file entry generating program 318 generates the file entry corresponding to the file "file A" on the memory circuit 306 and writes the "file A" as the name data.

At step 02 (S02), the record entry generating means 310 acquires the record entry corresponding to the new recording area on the memory circuit 306.

The file entry generating program 318 uses the no. of the record entry acquired as the identification data when the processing of S02 is performed for the first time on the file "file A" and writes this into the file entry generated by the processing of S01 as the head record entry no.

The recording length data generating means 316 counts the number of blocks which the empty area securing program 322 wrote in and generates the recording length data. The link data generating program 312 generates link data based on the no. of the newly acquired file entry.

The record entry generating program 310 writes the recording length data and the link data in the record entry on the memory circuit 306 corresponding to the recording area where the writing has been finished in the processing of the previous S03 to S06.

At step 03 (S03), the empty area securing program 322 performs processing based on the file entry and record entry stored in the memory circuit 306 and secures an empty recording area on the MO disc 40. Specifically, for example, in the example shown in FIG. 6C, it secures the blocks 200 to 1,200 or, in the example shown in FIG. 7C, the empty area securing program 322 first secures the blocks 1,200 to 1,300 on the MO disc 40, then successively secures the blocks 1,400 to 2,000 and the blocks 1,400 to 2,000 each time it is activated.

The head position data generating program 314 generates the head position data based on the head position in the MO disc 40 of the secured empty recording area. The record entry generating program 310 writes the head position data in the record entry generated by the processing of S02.

At step 04 (S04), the recordal data writing program 324 controls the W/R apparatus 302 and successively writes in one block units on the empty recording area on the MO disc 40 secured by the empty area securing program 322 in the processing of S02 the recordal data of the file "file A" input as the input high-efficient encoded video data S11b and converted in format by the control format conversion apparatus 121.

At step 05 (S05), the recordal data writing program 324 judges if there is any recordal data of the file "file A" to be written remaining each time one block's worth of writing is finished. If there is no recordal data remaining, the routine proceeds to the processing of S07, while if there is recordal data remaining, it proceeds to the processing of S06.

At step 06 (S06), the empty recording area management program 328 judges if there is any empty area remaining in the recording area secured by the empty area securing program 322 at the processing of S02. If there is empty area remaining in the recording area, the routine proceeds to the processing of S04, while if there is none remaining, it proceeds to the processing of S02.

At step 07 (S07), the link data generating program 312 generates the end-of-file (EOF) as the link data, while the record entry generating program 310 writes the link data in the record entry generated by the processing of S02.

At step 08 (S08), the data management program 330 records the file entry and record entry generated on the memory circuit 306 at a predetermined recording area of the MO disc 40.

Figure 9:
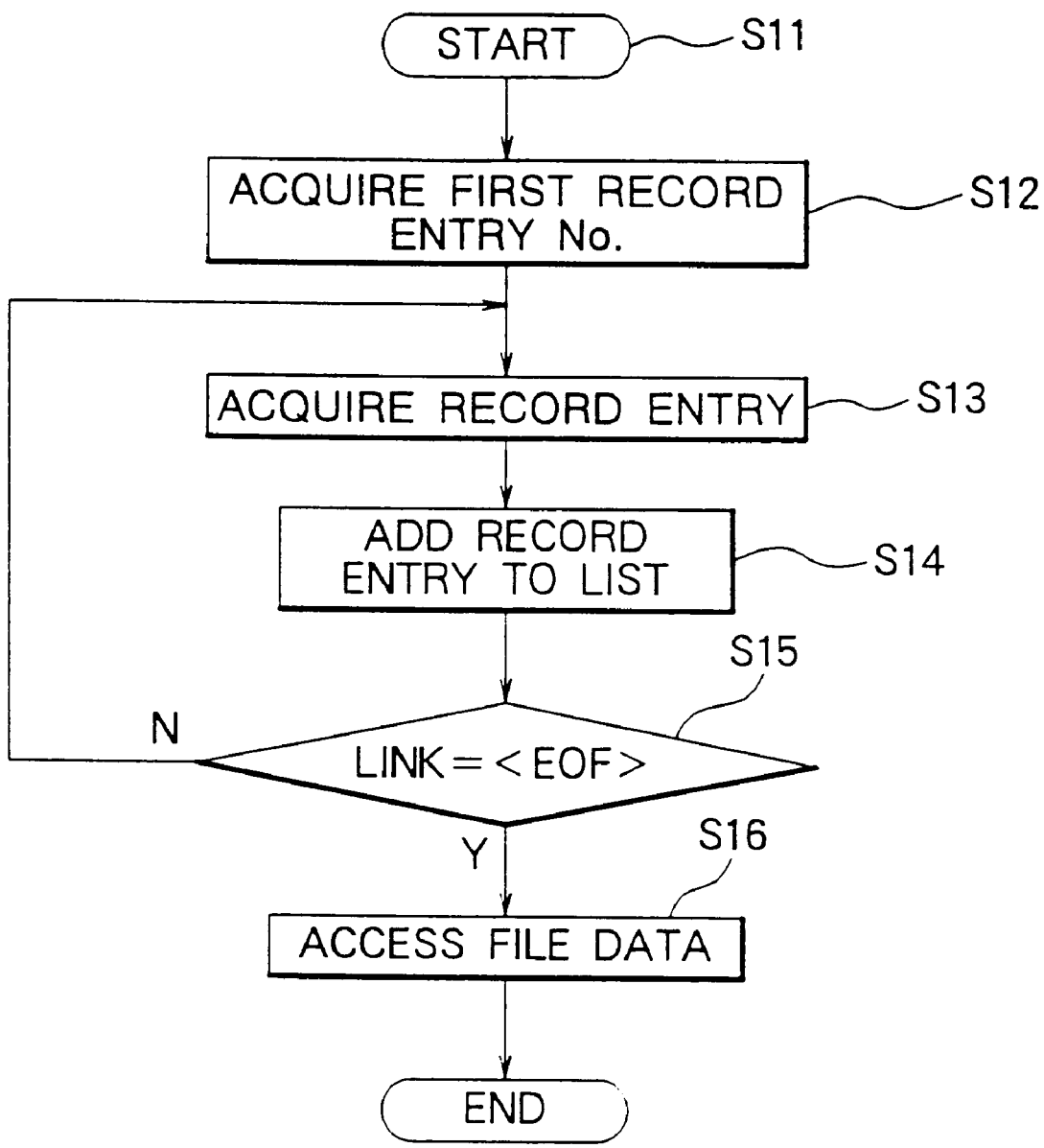
FIG. 9 is a flow chart of the processing of the data management apparatus according to the present invention in the case where the data storage apparatus shown in FIG. 3 reads recordal data from an MO disc.

The data management apparatus 340 performs the processing according to the flow chart of FIG. 9 when reading the file "file A" recorded on the MO disc 40 as explained above with reference to FIG. 8.

AS shown in FIG. 9, at step 11 (S11), when there is a control signal S14 including the name data "file A" and to the effect of causing the file "file A" to be read from the MO disc 40 input from the synchronous system control execution apparatus 16 to the control circuit 304, the access management program 320 activates the recordal data reading program 332. The recordal data reading program 332 controls the W/R apparatus 302 to read the file entries and record entries from the MO disc 40 and store them in the memory circuit 306.

At step 12 (S12), the access management program 320 compares the name data of the file entries in the memory circuit 306 with the name data "file A" received from the synchronous system control execution apparatus 16 and finds the file entry corresponding to the file "file A", that is, where these match. Further, the access management program 320 acquires the no. of the record entry shown by the identification data of the found file entry.

At step 13 (S13), the access management program 320 acquires the record entry of the no. acquired at S12 when first performing the processing of S13 on the file "file A" and acquires the record entry of the no. shown by the link data of the record entry acquired at the processing of the former S13 in other cases.

At step 14 (S14), the access management program 320 adds to the list on the memory circuit 306 the record entry acquired in the processing of S13.

At step 15 (S15), the access management program 320 judges if the link data of the record entry acquired in the processing of S13 is an "end-of-file" (EOF). If an EOF, the routine proceeds to S16 while if not an EOF, the routine proceeds to S13.

At step 16 (S16), the access management program 320 activates the recordal data reading program 332. The recordal data reading program 332 controls the W/R apparatus 302 to cause it to read the file "file A" from the recording areas of the MO disc 40 shown by the record entries on the list. The recordal data read by the recordal data reading program 332 is converted in format by the control format conversion apparatus 121 and output as the reproduced high-efficient encoded video data S15a to the line switching apparatus 11.

According to the data management apparatus 340 explained above, under the same conditions where the FAT system etc. required a table of a data length of 400 kbytes, the file "file A" for example became 10 bytes in the case of recording on a single recording area as shown in FIG. 6C and 30 bytes even when recorded divided among three recording areas as shown in FIG. 7C, i.e., much smaller amounts.

Accordingly, if the data management apparatus 340 is used, it is possible to use almost all of the recording capacity of an MO disc 40 for recording video data and audio data.

Further, since the amount of the data of the table required for data management is small, the amount of processing required for the data management is short, so the data storage apparatus $30_i$ can record and reproduce data at a high speed.

Further, since even if the length of data of a block is short, the length of data of the table required for data management will not become long, so there is little waste in the MO disc 40.

The data storage apparatus $30_i$ and data management apparatus 340 shown in the embodiments may be used not only for video signal server systems, but also for recordal data in general computers.

Further, the recording medium of the data storage apparatus $30_i$ is not limited to an MO disc 40. Suitable modifications may be made to the W/R apparatus 302 and for example use may be made of an HD, floppy disc, or magnetic tape.

Further, the configuration of the software of the data management apparatus 340 was just an illustration. Changes may be made for the greater convenience of preparing the software.

Further the data storage apparatus $30_i$ may be configured to manage data by the record entry system using the data management apparatus 240 for part of the areas of the MO disc 40 and to manage data by the FAT system or the i-node system for the other areas. This will be explained next as a method of data management of a second aspect of the present invention.

In an AV server apparatus such as shown in FIG. 3, simultaneous with the AV data, there are recorded text information such as camera records and comments relating to the AV data or teleprompts for the time of transmission of the program. These are used together with the AV data. At this time, it becomes necessary to simultaneously record on the same recording medium of the data storage apparatus 93 AV data large in data size and to be mainly continuously accessed and text data small in data size and not requiring continuous access.

FIG. 10A is a view of the configuration of recording areas on an MO disk and FIG. 10B is a view of the configuration in a system area SA.

The MO disk of the present embodiment is used divided into four areas: a system area SA, file entries FE, a continuous area CA, and a random area RA. Data is actually recorded in the continuous area CA, that is, the area where continuous data is recorded, and the random area RA, that is, the area where random data is recorded. The system area SA, as shown in FIG. 10B, is an area where the parameters of the disk as a whole are given. The medium identifier, user information, and file system parameters are recorded there. The user information is an area open to the user. The file system parameters include the starting blocks of the file entries FE, the continuous area CA, and the random area RA, the number of file entries, and the number of record entries and i-nodes.

The file entries FE are of the same configuration for the continuous area CA and the random area RA, but are provided separate for these areas. The configuration of a file entry FE is shown in FIG. 11. As shown in FIG. 3, a file entry FE records along with the file name the type of the file, that is, if it is of continuous data or random data. Further, the next four bytes after the file type record the pointers of the areas. These record the pointer to the head record entry of the file data of the continuous area when the type of the file is one of continuous data or the pointer to the i-node no. of the file data of a random area RA when the type of the data is one of random data.

The continuous area CA manages the recordal data by the record entry system.

The continuous area CA, as shown in FIG. 10A, includes a superblock showing the internal structure of a continuous area CA, a record entry, empty area information, and a continuous data recording area.

Figures 2A, 2B, 2C:
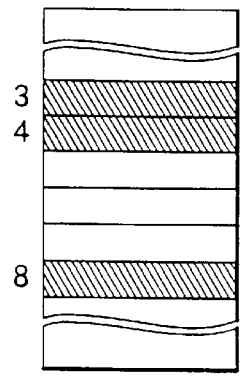

The random area RA manages the recordal data by the i-node system. The i-node system is the same as the system explained with reference to FIG. 2.

The random area RA, as shown in FIG. 10A, includes a superblock showing the internal structure of the random area RA, an i-node bit map showing the empty area of the i-node, a block bit map showing the empty area, an i-node recording area, and a random data recording area.

Next, an explanation will be made of the routine in an MO drive for accessing data in an MO disk medium of this configuration.

First, when an MO disk is inserted into an MO drive, first, the system area SA is read and then a judgement is made as to at which positions of the disk the file entry FA, continuous area CA, and random area RA are at.

A superblock is read for the continuous area CA and random area RA and the management information at each recording area is read.

The MO drive acquires the management information from the information and determines the access position.

Figure 12:
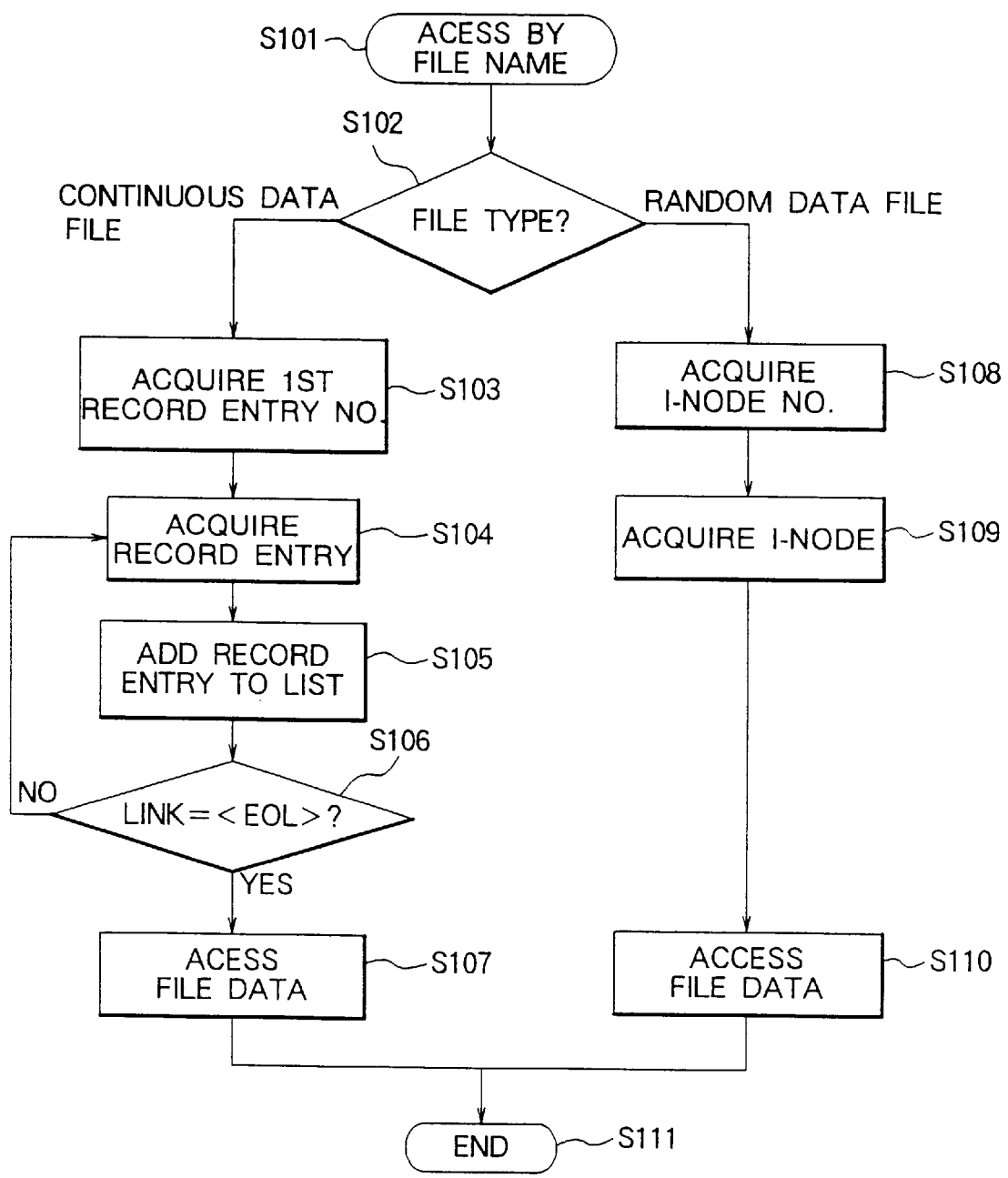
FIG. 12 is a flow chart of the procedure for access to file data.

The routine for access to the file data will now be explained with reference to the flow chart of FIG. 12.

First, the file entry is acquired from the file name of the file to be accessed (step S101). Next, the file type is acquired from a file entry and a judgement is made if the file is a continuous data file or random data file (step S102).

In the case of a continuous data file, the first record entry no. is acquired from file entry and the no. is set in the access record list (step S103). Next, the record entry of the acquired record no. is loaded (step S104). The record entry is added to the access record list (step S105). Next, the LINK of the record entry is referred to. If LINK≠EOL, then the record no. of the LINK is set for the acquired record no., and the processing of step S104 and on is repeated (step S106). At step S106, if LINK=EOL, the file data is accessed in accordance with the access record list.

On the other hand, at step S102, when the file to be accessed is a random data file, the i-node no. is acquired from the file entry (step S108). Next, the i-node of the i-node no. is loaded in the memory (step S109). Then, the file data is accessed in accordance with the block pointer stated in the i-node (step S110).

At step S107 and step S110, when access to the file data ends, the processing is ended (step S111).

In this way, according to the method of data management of the second aspect of the present invention, the recordal data is divided into continuous data and random data and each is recorded in its own predetermined area by a predetermined system of management. Accordingly, suitably efficient management becomes possible and efficient recordal of data becomes possible. For example, in the AV server apparatus shown in FIG. 3, by having the AV data written in the continuous area CA as the continuous data and managed by the record entry system, while having text information such as camera records and comments and teleprompts at the time of broadcasting a program stored in the random area as random data and managed by the i-node or FAT system, it is possible to manage data efficiently in accordance with the properties of the data.

Further, since the data recording areas are separated, it is possible to reduce the fragments in recording continuous data and possible to record continuous data in a manner enabling easy continuous access.

Further, the method of file management of a random area RA was made the i-node system, but this may be the FAT system as well.

Now then, when recording AV data, sometimes the state of recording the AV data, an explanation of the content, static image data for identifying the data, etc. is desired to be recorded along with the same.

Each of the above-mentioned methods of file management, however, were configured with a single data area given correspondence to a single file name. Accordingly, it was not possible to establish correspondence between the AV data and the related data. To give correspondence, the correspondence had to be managed at the application level. In this type of method, however, it was necessary to constantly bear in mind the correspondence, so handling of data files became troublesome. Accordingly, a method of data management according to a third aspect of the invention is proposed.

In this method of data management of the third aspect, continuous data and random data are mixed in a single file and are managed by separated methods.

In the method of data management of the third aspect of the invention as well, the overall configuration of the recording areas on the MO disk 40 is the same as in FIG. 10A.

The configuration of a file entry FE is shown in FIG. 13. As shown in FIG. 13, a file entry FE records for a single file name both of the pointer for the data of the continuous area CA, i.e., the record entry no., and the pointer for the data of the random area RA, i.e., the i-node no. Further, the file entry FE records for the data entries information on the two data sizes, creation dates, and creation times. Therefore, according to this configuration of the file entry FE, correspondence is given for data corresponding to what is normally two files to a single file name.

The continuous area CA manages the recordal data by the record entry system.

The random area RA manages the recordal data by the i-node system. The i-node system is the same as the method explained with reference to FIG. 2A to 2C. The data is managed by an i-node such as shown in FIG. 14. Next, an explanation will be made of the routine in an MO drive 30 for accessing data in an MO disk medium 40 of this configuration.

First, when an MO disk is inserted into an MO drive, first, the system area SA is read and then a judgement is made as to at which positions of the disk the file entry FA, continuous area CA, and random area RA are at from the parameters of the file system.

A superblock is read for the continuous area CA and random area RA and the management information at each recording area is read.

The access by the MO drive to the individual data files is switched by commands or command options in accordance with the types of the data.

Figure 15:
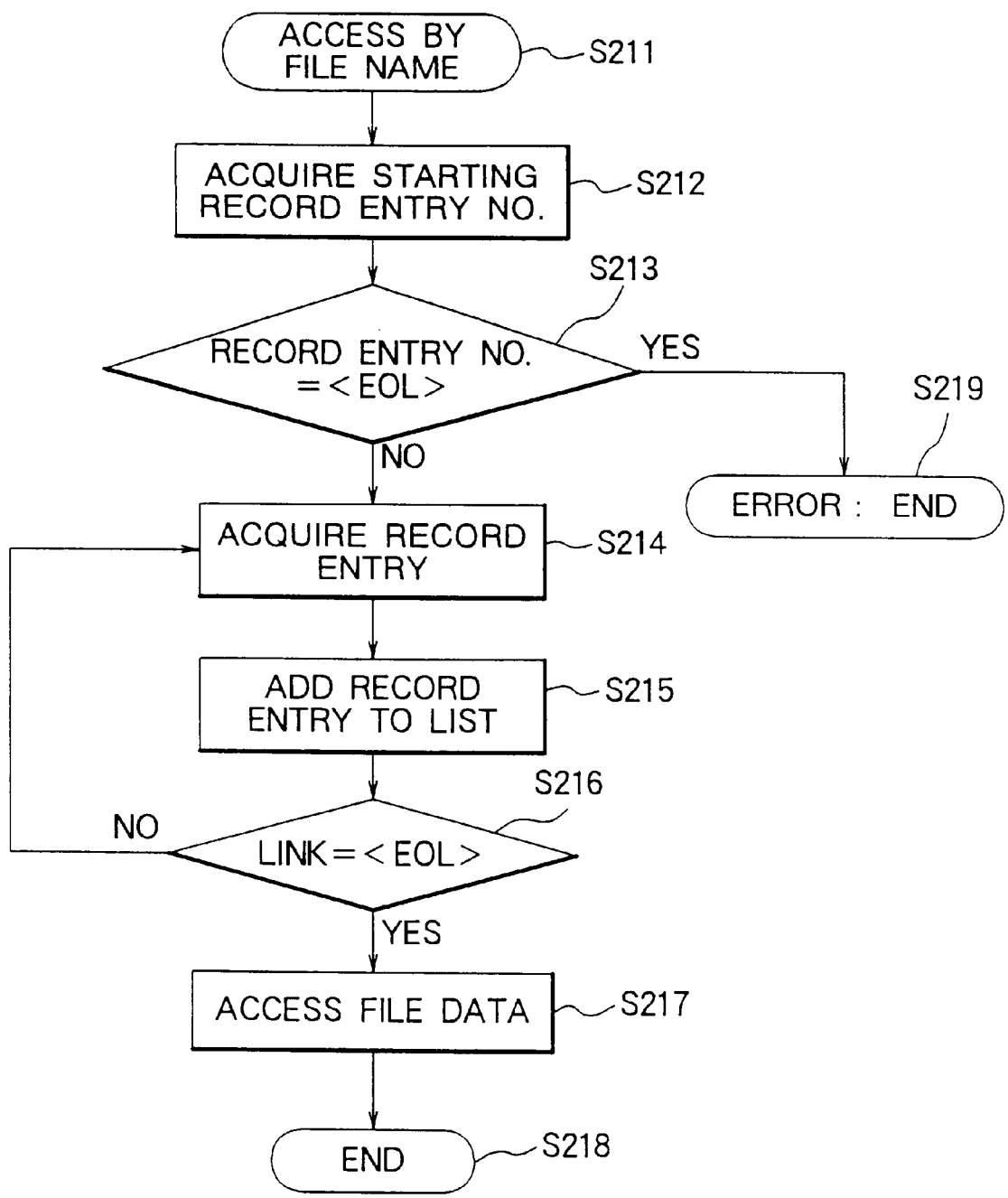
FIG. 15 is a flow chart of the procedure for access to a data file data in the case of execution of a PLAY command.

In an MO drive of the present embodiment, switching is performed in the four commands of
 (1) Reading of continuous data PLAY
 (2) Writing of continuous data RECORD
 (3) Reading of random data READ
 (4) Writing of random data WRITE The access to a data file when a PLAY command is executed, for example, is performed as follows as shown in the flow chart of FIG. 15.

First, a file entry is acquired from the file name (step S211). A first record entry no. is acquired from the file entry and is set as the acquired record no. (step S212). When the acquired record no. is "EOL" (step S13), "ERROR" is output and the processing is ended (step S219). If the acquired record no. at step S213 is not "EOL", the record entry of the acquired record no. is loaded (step S214) and the record entry is added to the access record list (step S215).

The LINK of the record entry is referred to. If LINK≠EOL, then the record no. of the LINK is set for the acquired record no. and the processing from step S213 is repeated (step S216). At step S216, if LINK=EOL, the file data is accessed in accordance with the access record list (step S217). When the access is ended, the processing ends (step S218).

Figure 16:
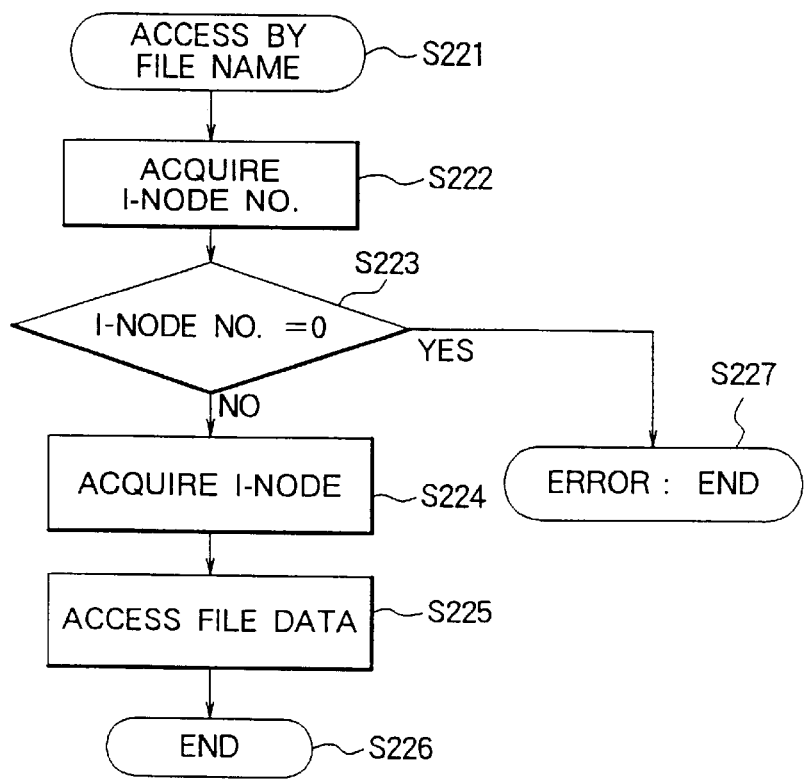
FIG. 16 is a flow chart of the procedure for access to a data file data in the case of execution of a READ command.

Further, the access to a data file when a READ command is executed is performed as follows as shown in the flow chart of FIG. 16.

First, a file entry is acquired from the file name (step S221). An i-node no. is acquired from the file entry (step S222). When the acquired i-node no. is "0" (step S223), "ERROR" is output and the processing is ended (step S227). If the i-node no. acquired at step S223 is not "0", the i-node of the i-node no. is loaded (step S224) and the file data is accessed in accordance with the block pointer given in the i-node (step S225). When the access is ended, the processing ends (step S226).

In this way, according to the method of data management of the present invention, the recordal data is divided into continuous data and random data and recorded by predetermined methods of management in predetermined areas. Further, it is made possible to access both of the continuous data and the random data by a single file name in the file entry. Accordingly, it becomes possible to efficiently record with correspondence the AV data and the related data.

Note that the method of data management of the present invention is not limited to this embodiment and can be modified in many ways.

According to the method of data management of the third aspect of the present invention, provision is made in a single file entry of pointers for both of continuous data files and random data files, so it is possible to provide a method of file management enabling easy establishment of correspondence between the continuous data requiring continuous access, such as audio data and video data, and random data, such as text data.

Further, it is possible to store with correspondence the AV data, the state of recordal or explanation of content relating to the AV data, static image data for identifying the data, etc., so it becomes possible to provide a data recording apparatus suitable for use for editing in an AV server apparatus etc.

Further, it is possible to manage data by a method of a fourth aspect of the invention combining the methods of data management of the second and third aspects of the invention. That is, it is possible to manage those files, among a number of files, which contain just continuous data by the record entry system, to manage other files which contain only random data by the i-node system or the FAT system, and to manage other files containing a mix of continuous data and random data by the method of data management described as the third aspect of the invention.

Next, an explanation will be made of backing up of data management information.

First, an explanation will be made of the backup of management information when managing data by the record entry system.

Figure 17:
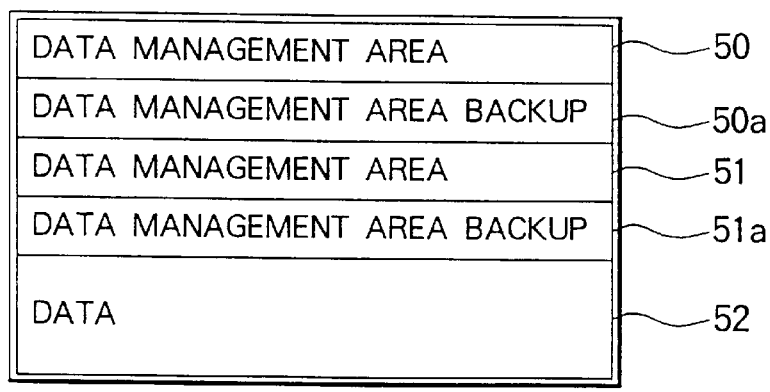
FIG. 17 is a view of the recording area of an MO disc divided into data management areas, backup data management areas, and a data area.

As shown in FIG. 17, the recording area of a MO disc 40 is divided into data management areas 50 and 51, backup data management areas 50a and 51a of the same size as the data management areas 50 and 51, and the data area 52.

The data management area 50 records file entries.

The backup data management area 50a records file entries as backup.

The data management area 51 records the record entries.

The backup data management area 51a records the record entries as backup.

The data area 52 records data managed by the file entries and the record entries.

The backup data management areas 50a and 51a are disposed directly behind the data management areas 50 and 51, respectively. The data management area 51 is disposed directly after the backup data management area 50a.

The data management area 50 and the backup data management area 50a record file entries continuously.

The data management area 51 and the backup data management area 51a record record entries continuously.

With this technique, since the backup data management areas 50a and 51a are disposed adjoining the data management areas 50 and 51, when recording the file entries and record entries in the backup data management areas 50a and 51a as backup, it is possible to hold to a minimum the seek operations of the recording head.

In particular, this technique is effective when the seek time is relatively long in an MO disc.

Further, with this technique, since all of the data management information is backed up, it is possible to enhance the reliability of the recording of data when a defect occurs in the MO disc 40.

Figure 18:
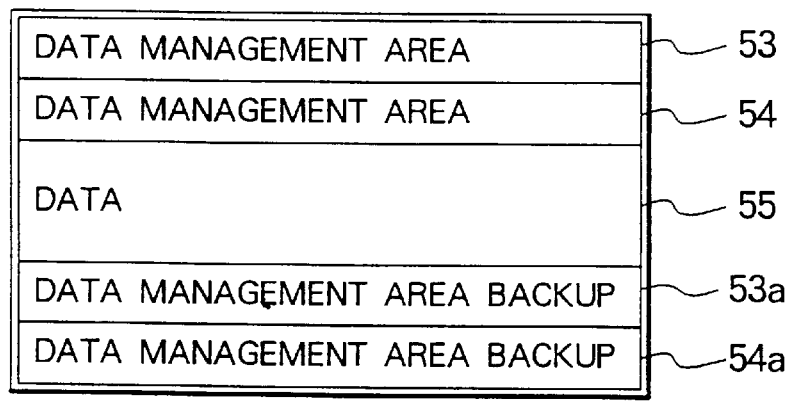
FIG. 18 is a view of another recording area of an MO disc divided into data management areas, backup data management areas, and a data area.

If the MO disc 40 is replaced by a hard disc here, the seek time becomes shorter, so the method of backup shown in FIG. 18 is sufficient.

As shown in FIG. 18, the recording area of the MO disc 40 is divided into the data management areas 53 and 54, the backup data management areas 53a and 54a of the same size as the data management areas 53 and 54, and the data area 55.

The data management area 53 records the file entries.

The backup data management area 53a records the file entries as backup.

The data management area 54 records the record entries.

The backup data management area 54a records the record entries as backup.

The data area 55 records the data managed by the file entries and the record entries.

The data management area 54 is disposed directly behind the data management area 53, while the backup data management area 54a is disposed directly behind the backup data management area 53a.

The backup data management area 53a is disposed directly behind the data area 55.

In this embodiment, the file entries are recorded in the data management area 53, then the recording head is made to engage in a seek operation and the entries are recorded in the buffer data management area 53a.

Further, the record entries are recorded in the data management area 54, then the recording head is made to engage in a seek operation and the entries are recorded in the buffer data management area 54a.

In this embodiment, for example, two recording heads are provided and the file entries are simultaneously recorded in the data management area 53 and the backup data management area 53a. Further, the record entries are simultaneously recorded in the data management area 54 and the backup data management area 54a.

Further, in this technique, since the data management areas 53 and 54 and the backup data management areas 53a and 53b are disposed separate from each other, when a recording area is destroyed by a scratch etc., the possibility of both of the data management areas 53 and 54 and the backup data management areas 53a and 54a being destroyed can be reduced. Therefore, it is possible to further enhance the reliability of the recording of data management information.

Next, an explanation will be made of the backup of management information when managing data by the above second and third methods of data management.

Figure 19:
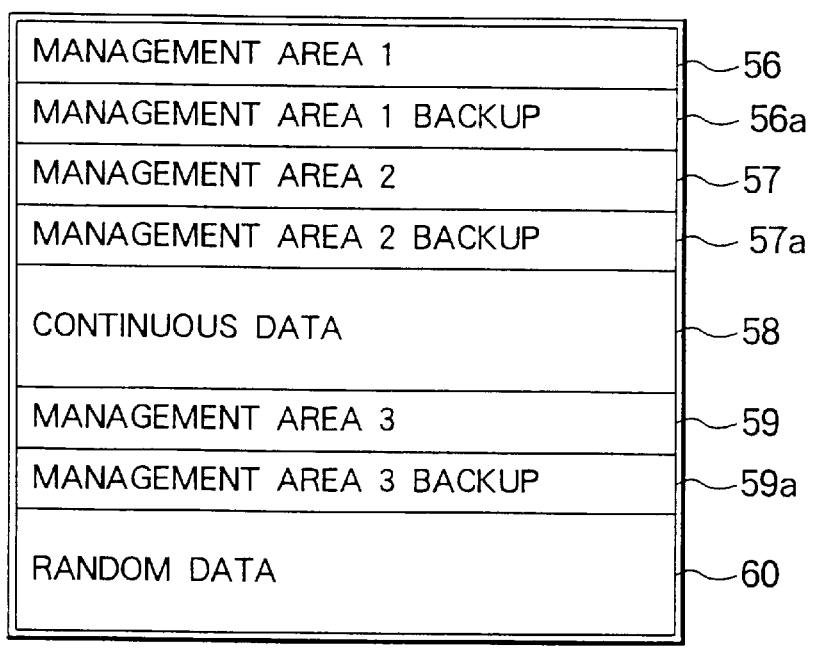
FIG. 19 is a view of another recording area of an MO disc divided into data management areas, backup data management areas, and data areas.

As shown in FIG. 19, the recording area of the MO disc 40 is divided into the data management areas 56, 57, and 59, the backup data management areas 56a, 57a, and 59a of the same size as the data management areas 56, 57, and 59, and the data areas 58 and 60.

The data management area 56 records the file entries.

The backup data management area 56a records the file entries as backup.

The data management area 57 records the record entries.

The backup data management area 57a records the record entries as backup.

The data management area 59 records the management information of the i-node system or FAT system.

The backup data management area 59a records the management information of the i-node system or FAT system as backup.

The data area 58 records the continuous data.

The data area 60 records the random data.

The backup data management areas 56a, 57a, and 59a are disposed directly behind the data management areas 56, 57, and 59. Further, the data management area 57 is disposed directly behind the backup data management area 56a. The data management area 58 is disposed directly behind the backup data management area 57a. The data management area 59 is disposed directly behind the backup data area 58. The data area 60 is disposed directly behind the backup data management area 59a.

The data management area 56 and the backup data management area 56a continuously or simultaneously record the file entries.

The data management area 57 and the backup data management area 57a continuously or simultaneously record the record entries.

The data management area 59 and the backup data management area 59a continuously or simultaneously record the data management information of the i-node system or FAT system.

With this technique, since the backup data management areas 56a, 57a, and 59a are disposed adjoining the data management areas 56, 57, and 59, when recording the file entries, record entries, or data management information in the backup data management areas 56a, 57a, and 59a, it is possible to eliminate or hold to a minimum the seek operations of the recording head.

Further, with this technique, since the data management information for managing the continuous data and the random data are recorded directly before the recording areas 58 and 60, it is possible to efficiently access the data management information and the continuous data and the random data managed by it.

We claim:

1. A randomly accessible recording medium, for storing alterable data comprised of a data area in which recordal data is recorded in one or more variable length recording blocks by file and a management data area in which file entries and recording entries for each recording block of the files are recorded, the file entries including name data showing the names of the recordal data recorded in the files and identification data showing the record entries of the first recording blocks in which the recordal data are recorded, the record entries including head position data showing the heads of the recording blocks, link data showing the recording blocks in which continuations of the recordal data are recorded, and recording length data showing the recording lengths of the recording blocks.

2. A method of data management for managing alterable data on a randomly accessible recording medium, comprising the steps of:

recording recordal data in a data area in one or more variable length recording blocks by file, recording file entries and recording entries for each recording block of the files in a management data area, the file entries including name data showing the names of the recordal data recorded in the files and identification data showing the record entries of the first recording blocks in which the recordal data are recorded, the record entries including head position data showing the heads of the recording blocks, link data showing the recording blocks in which continuations of the recordal data are recorded, and recording length data showing the recording lengths of the recording blocks finding the file by using the name data showing the name of the recordal data to be accessed find the file entry, and accessing the recordal data by using the head position data and the recording length data of the record entry shown by the identification data of the file entry of the recordal data to be accessed and the record entry shown by the link data of that record entry.

3. A randomly accessible recording medium for storing alterable data comprised of:

at least one first recording area in which continuous data requiring continuous access is recorded in one or more variable length blocks by file, and at least one second recording area in which random data not requiring continuous access is recorded in one or more fixed length blocks by file, management data including at least data showing if the data recorded in a file is continuous data or random data being recorded on said recording medium.

4. The randomly accessible recording medium as set forth in claim 3, wherein said continuous data is comprised of video or audio signals, and said random data is text data such as camera recording memos or the like relating to the video or audio signals.

5. A randomly accessible recording medium adapted to record alterable data, said data including at least a plurality of files having continuous data requiring continuous access recorded in one or more variable length blocks, random data not requiring continuous access recorded in one or more fixed length blocks, first management data showing the recording positions of the continuous data, and second management data showing the recording positions of the random data.

6. The randomly accessible recording medium as set forth in claim 5, wherein said continuous data is comprised of video or audio signals, and said random data is text data such as camera recording memos or the like relating to the video or audio signals.

* * * * *